(12) United States Patent
Yong et al.

(10) Patent No.: US 11,899,702 B2
(45) Date of Patent: Feb. 13, 2024

(54) SYSTEM OF VISUALIZING VALIDITY LEVEL OF SEARCHING, METHOD OF VISUALIZING VALIDITY LEVEL OF SEARCHING, AND CARRIER MEANS

(71) Applicants: Jiawei Yong, Kanagawa (JP); Kiyohiko Shinomiya, Tokyo (JP); Katsumi Kanasaki, Tokyo (JP); Shintaro Kawamura, Kanagawa (JP)

(72) Inventors: Jiawei Yong, Kanagawa (JP); Kiyohiko Shinomiya, Tokyo (JP); Katsumi Kanasaki, Tokyo (JP); Shintaro Kawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/760,888

(22) PCT Filed: Nov. 11, 2020

(86) PCT No.: PCT/IB2020/060594
§ 371 (c)(1),
(2) Date: Mar. 16, 2022

(87) PCT Pub. No.: WO2021/105810
PCT Pub. Date: Jun. 3, 2021

(65) Prior Publication Data
US 2022/0342917 A1  Oct. 27, 2022

(30) Foreign Application Priority Data
Nov. 28, 2019  (JP) .................................. 2019-215838

(51) Int. Cl.
*G06F 16/338* (2019.01)
*G06F 16/33* (2019.01)

(52) U.S. Cl.
CPC .......... *G06F 16/338* (2019.01); *G06F 16/334* (2019.01)

(58) Field of Classification Search
CPC ..................................................... G06F 16/338
See application file for complete search history.

(56) References Cited

U.S. PATENT DOCUMENTS 5,680,612 A  10/1997 Asada et al.
2009/0019031 A1* 1/2009 Krovitz .................. G06F 16/54
707/999.005

(Continued)

FOREIGN PATENT DOCUMENTS

JP  2003-323275  11/2003
JP  2005-234868  9/2005

(Continued)

OTHER PUBLICATIONS

International Search Report dated Feb. 1, 2021 in PCT/IB2020/060594 filed on Nov. 11, 2020.

(Continued)

*Primary Examiner* — Van H Oberly
(74) *Attorney, Agent, or Firm* — Harness, Dickey & Pierce, P.L.C.

(57) ABSTRACT

A search system (10) includes a search term acquisition unit (111) configured to acquire a search term; a full-text search unit (112) configured to perform a searching operation based on the search term; and a visualization unit (114) configured to display a corresponding relationship between the search term and a result obtained by performing the searching operation.

20 Claims, 18 Drawing Sheets

(56) References Cited

U.S. PATENT DOCUMENTS

| | | | |
|---|---|---|---|
| 2010/0076966 A1* | 3/2010 | Strutton | G06F 16/137 |
| | | | 707/E17.108 |
| 2014/0098140 A1* | 4/2014 | Tran | G06F 3/1446 |
| | | | 345/660 |
| 2015/0242493 A1* | 8/2015 | Misra | G06F 16/3338 |
| | | | 707/727 |
| 2015/0317320 A1 | 11/2015 | Miller et al. | |
| 2017/0091288 A1* | 3/2017 | Cohen | G06N 5/00 |
| 2018/0373719 A1 | 12/2018 | Valliani et al. | |
| 2019/0171734 A1 | 6/2019 | Furuta et al. | |
| 2019/0222637 A1 | 7/2019 | Kanasaki | |
| 2019/0261245 A1 | 8/2019 | Yoshimitsu et al. | |

FOREIGN PATENT DOCUMENTS

| | | |
|---|---|---|
| JP | 2014-052803 A | 3/2014 |
| JP | 2017-515249 A | 6/2017 |
| WO | 2009/048130 A1 | 4/2009 |

OTHER PUBLICATIONS

U.S. Appl. No. 07/276,866, filed Nov. 28, 1988, Katsumi Kanasaki
Wikipedia: "Relevance Feedback", Sep. 23, 2019 (Sep. 23, 2019), pp. 1-3, XP055768006, Retrieved from the Internet: URL:https://en.wikipedia.org/w/index.php?title=Relevance_feedback&oldid=917335882 [retrieved on Jan. 22, 2021] the whole document.
Office Action dated Jul. 25, 2023 issued in corresponding Japanese Patent Application No. 2019-215838.

* cited by examiner

FIG. 8

| DOCUMENT ID | TITLE | DOCUMENT CONTENT |
|---|---|---|
| DOCUMENT 1 | TITLE 1 | CONTENT 1 |
| DOCUMENT 2 | TITLE 2 | CONTENT 2 |
| DOCUMENT 3 | TITLE 3 | CONTENT 3 |
| DOCUMENT 4 | TITLE 4 | CONTENT 4 |
| DOCUMENT 5 | TITLE 5 | CONTENT 5 |

FIG. 9

| ORIGINAL SEARCH TERM | |
|---|---|
| TERM | WEIGHT |
| SEARCH TERM 1 | 0.3 |
| SEARCH TERM 2 | 0.3 |
| SEARCH TERM 3 | 0.3 |

| EXTENDED TERM | |
|---|---|
| TERM | WEIGHT |
| EXTENDED TERM 1 | 0.05 |
| EXTENDED TERM 2 | 0.05 |

| SEARCH RESULT OF RE-SEARCHING OPERATION | | | |
|---|---|---|---|
| RANK | DOCUMENT ID | TITLE | DOCUMENT CONTENT |
| RANK 1 | DOCUMENT 4 | TITLE 4 | CONTENT 4 |
| RANK 2 | DOCUMENT 2 | TITLE 2 | CONTENT 2 |
| RANK 3 | DOCUMENT 1 | TITLE 1 | CONTENT 1 |
| RANK 4 | DOCUMENT 5 | TITLE 5 | CONTENT 5 |
| RANK 5 | DOCUMENT 3 | TITLE 3 | CONTENT 3 |

FIG. 10

| | | | SEARCH RESULT OF RE-SEARCHING OPERATION | | | |
|---|---|---|---|---|---|---|
| RANK | DOCUMENT ID | TITLE | APPEARED SEARCH TERM | WEIGHT | APPEARING NUMBER | VECTOR SIMILARITY |
| RANK 1 | DOCUMENT 4 | TITLE 4 | SEARCH TERM 1 | 0.3 | 2 | 0.15 |
| | | | SEARCH TERM 2 | 0.3 | 3 | 0.13 |
| | | | EXTENDED TERM 1 | 0.05 | 2 | 0.14 |
| | | | EXTENDED TERM 2 | 0.05 | 1 | 0.10 |
| RANK 2 | DOCUMENT 2 | TITLE 2 | SEARCH TERM 2 | 0.3 | 2 | 0.16 |
| | | | EXTENDED TERM 1 | 0.05 | 1 | 0.13 |
| | | | EXTENDED TERM 2 | 0.05 | 2 | 0.12 |
| RANK 3 | DOCUMENT 1 | TITLE 1 | SEARCH TERM 1 | 0.3 | 2 | 0.21 |
| | | | EXTENDED TERM 1 | 0.05 | 1 | 0.12 |
| | | | EXTENDED TERM 2 | 0.05 | 3 | 0.11 |
| RANK 4 | DOCUMENT 5 | TITLE 5 | SEARCH TERM 1 | 0.3 | 2 | 0.31 |
| | | | SEARCH TERM 2 | 0.3 | 1 | 0.11 |
| | | | SEARCH TERM 3 | 0.3 | 3 | 0.16 |
| | | | EXTENDED TERM 1 | 0.05 | 2 | 0.15 |
| RANK 5 | DOCUMENT 3 | TITLE 3 | SEARCH TERM 1 | 0.3 | 4 | 0.32 |
| | | | SEARCH TERM 2 | 0.3 | 3 | 0.21 |
| | | | SEARCH TERM 3 | 0.3 | 3 | 0.14 |
| | | | EXTENDED TERM 1 | 0.05 | 2 | 0.32 |
| | | | EXTENDED TERM 2 | 0.05 | 1 | 0.12 |

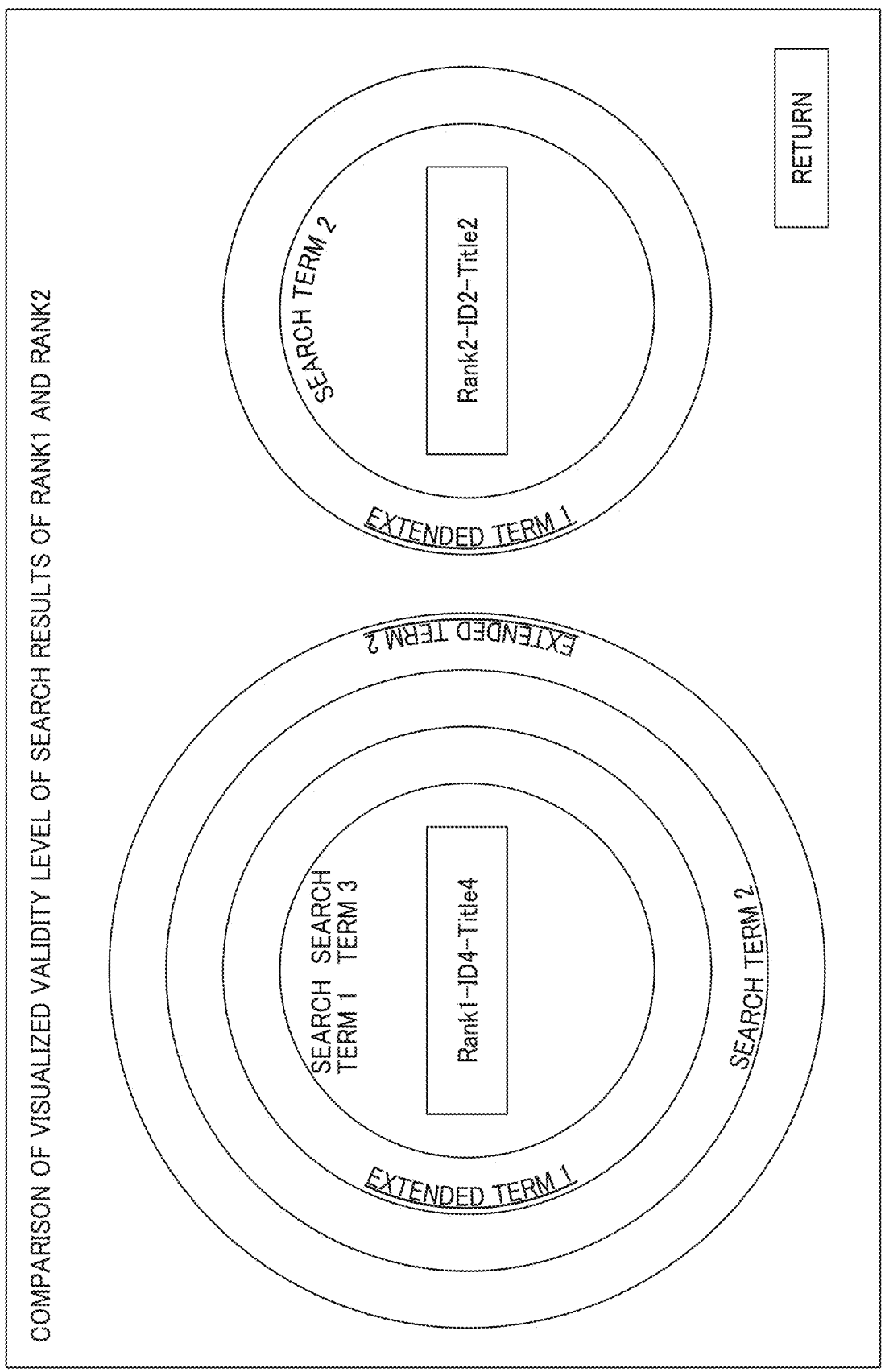

SYSTEM OF VISUALIZING VALIDITY LEVEL OF SEARCHING, METHOD OF VISUALIZING VALIDITY LEVEL OF SEARCHING, AND CARRIER MEANS

CROSS-REFERENCE TO RELATED APPLICATIONS

This application is a national phase under 35 U.S.C. § 371 of PCT International Application No. PCT/IB2020/060594 which has an International filing date of Nov. 11, 2020, which claims priority to Japanese Application No. 2019-215838, filed Nov. 28, 2019, the entire contents of each of which are hereby incorporated by reference.

TECHNICAL FIELD

This disclosure relates to a system of visualizing validity level of searching, a method of visualizing validity level of searching, and carrier means.

BACKGROUND

Conventionally, searching is performed based on one or more search terms extracted from one or more natural sentences input by users, and results of the searching are ranked.

For example, International Application Publication No. WO 2009/048130 (PTL1) discloses a technology for calculating the importance level of documents as an index of matching degree of search conditions, and then displays the documents. Specifically, documents plotted at the upper left and bottom right of a two dimensional plane are displayed as the documents that match each of the search conditions as disclosed in paragraph [0145] and FIG. 32 of International Application Publication No. WO 2009/048130 (PTL1).

CITATION LIST

Patent Literature

PTL1

International Application Publication No. WO 2009/048130

SUMMARY

Technical Problem

However, as to International Application Publication No. WO 2009/048130 (PTL1), the documents are displayed only by indicating which document is closer to which search condition, and thereby the users may not comprehend validity level of results obtained by performing a searching operation.

This disclosure discloses an embodiment that is devised in view of the above described issue to enable to improve visualization of validity level of results obtained by performing a searching operation.

Solution to Problem

In one aspect of the present invention, a search system includes a search term acquisition unit configured to acquire a search term; a full-text search unit configured to perform a searching operation based on the search term; and a visualization unit configured to display a corresponding relationship between the search term and a result obtained by performing the searching operation.

Advantageous Effects of Invention

As to the embodiment of this disclosure, visualization of validity level of results obtained by performing a searching operation can be improved.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 8 is an example of data configuration information of search target according to embodiments 1 and 2 of this disclosure.

FIG. 9 is an example of data configuration information of search sentence and search result according to embodiment 2 of this disclosure.

FIG. 10 is an example of data configuration information of impact of search term according to embodiment 2 of this disclosure.

FIG. 21 is an example of screen used for comparing visualized validity level of search results according to embodiment 2 of this disclosure.

DESCRIPTION OF EMBODIMENTS

Figure 1:
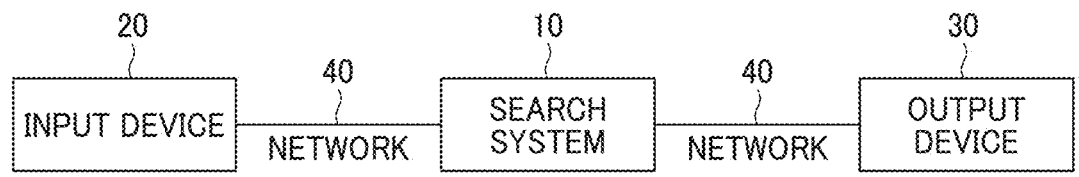
FIG. 1 is a schematic configuration of a system including a search system according to an embodiment of this disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Hereinafter, a description is given of a configuration for carrying out the present invention with reference to the drawings.

Hereinafter, a description is given of one or more embodiments with reference to the drawings. In each drawing and this disclosure, the same or similar components are denoted by the same reference numerals, and the duplicate description may be omitted.

(System Configuration)

FIG. 1 is a schematic configuration of a system including a search system 10 according to an embodiment of this disclosure. As illustrated in FIG. 1, the search system 10 is communicatively connected to an input device 20 and an output device 30 via a network 40. Hereinafter, a description is given of each device and system.

The search system 10 is a system that extracts a search term from a sentence, such as natural sentence (hereinafter, referred to as search sentence) input by a user to perform a searching operation. In this description, the search term may mean one or more search terms, and the search sentence may mean one or more search sentences. The search system 10 can visualize validity level of results obtained by performing a searching operation. Specifically, the search system 10 can display, on the output device 30, the validity level of results obtained by performing the searching operation. The search system 10 will be described in detail later with reference to FIGS. 3 and 4.

The input device 20 is a device used by a user for inputting a search sentence. For example, the input device 20 employs a personal computer, a tablet, a smartphone, or the like.

The output device 30 is a device used for displaying a search result obtained by performing the searching operation using the search system 10. For example, the output device 30 employs a personal computer, a tablet, a smartphone, or the like.

Although the input device 20 and the output device 30 are described as different devices in FIG. 1, the input device 20 and the output device 30 may be implemented as one device.

The apparatuses and devices described in the embodiment merely indicate one example of multiple computing environment that can implement the embodiment of this disclosure. In one embodiment, the search system 10 may include a plurality of computing devices as a server cluster. The plurality of computing devices are configured to communicate with each other via any type of communication link, including network or shared memory, and perform the processing disclosed in this description.

(Hardware Configuration)

Figure 2:
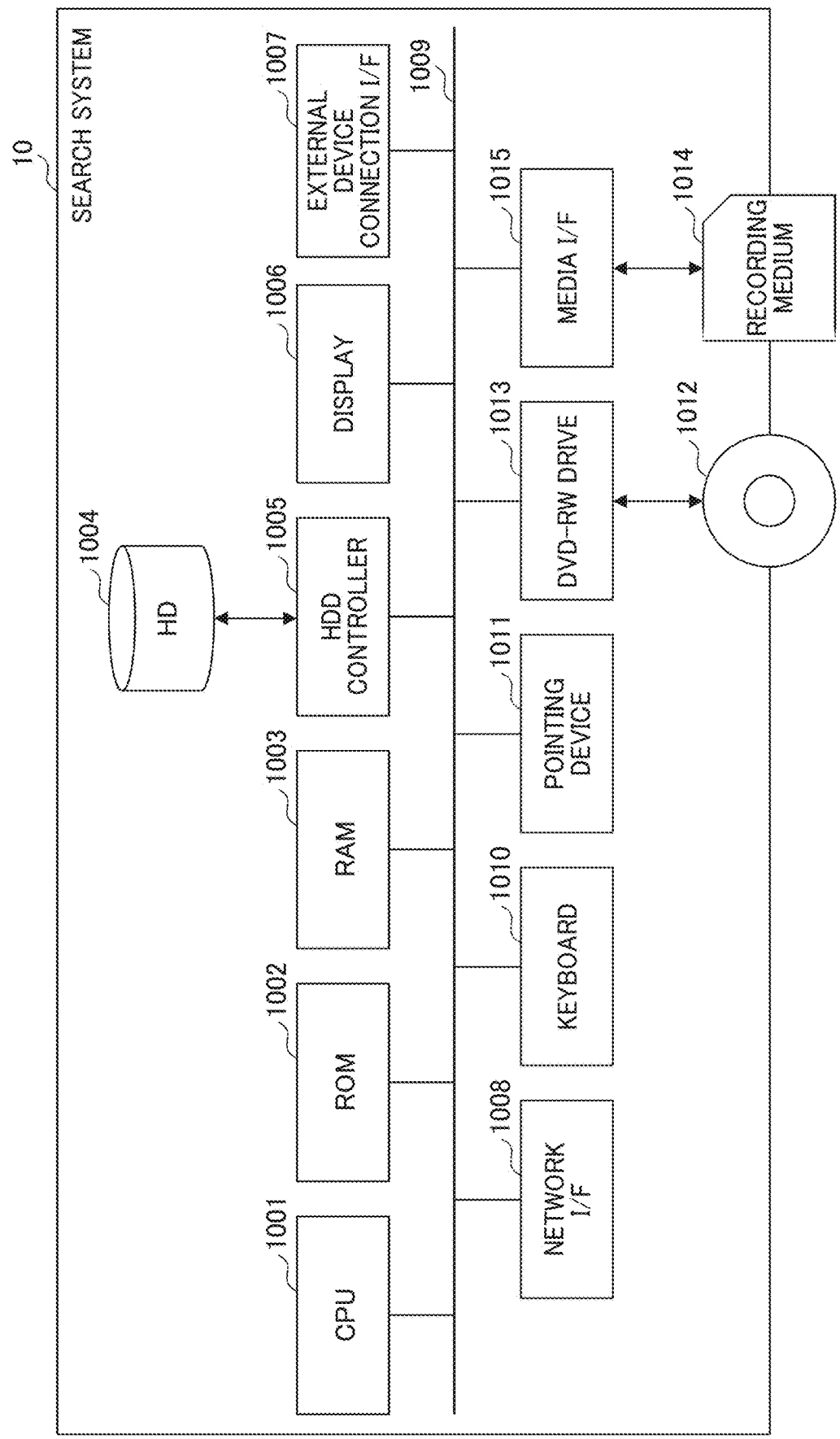
FIG. 2 is an example of configuration of hardware block diagram of a search system according to an embodiment of this disclosure.

FIG. 2 is an example of configuration of hardware block diagram of the search system 10.

As illustrated in FIG. 2, the search system 10, configured by computer, includes, for example, central processing unit (CPU) 1001, read only memory (ROM) 1002, random access memory (RAM) 1003, hard disk (HD) 1004, hard disk drive (HDD) controller 1005, display 1006, external device connection interface (I/F) 1007, network interface (I/F) 1008, data bus 1009, keyboard 1010, pointing device 1011, digital versatile disk rewritable (DVD-RW) drive 1013, and media interface (I/F) 1015.

The CPU 1001 controls the operation of the search system 10 entirely. The ROM 1002 stores programs used for driving the CPU 1001, such as initial program loader (IPL). The RAM 1003 is used as a work area of the CPU 1001. The HD 1004 stores various data, such as programs. The HDD controller 1005 controls reading and writing of various data with the HD 1004 under the control of the CPU 1001. The display 1006 displays various information such as cursor, menus, windows, characters, or images. The external device connection I/F 1007 is an interface for connecting various external devices. The external device is, for example, universal serial bus (USB) memory, printer, or the like. The network I/F 1008 is an interface for performing data communication by utilizing the communication network 9. The data bus 1009 is address bus and data bus used for electrically connecting each of the components, such as the CPU 1001, illustrated in FIG. 2.

The keyboard 1010 is a type of input unit having a plurality of keys used for inputting characters, numerals, various instructions, or the like. The pointing device 1011 is a type of input unit used for selecting and executing various instructions, selecting a process target, moving a cursor, or the like.

The DVD-RW drive 1013 controls reading and writing of various data with the DVD-RW 1012 used as an example of removable recording media. The computer may include digital versatile disk recordable (DVD-R) in addition to or instead of DVD-RW. The media I/F 1015 controls reading and writing (storing) of data with a recording medium 1014, such as flash memory.

(Functional Configuration)

Hereinafter, with reference to FIGS. 3 and 4, a description is given of functional configuration of the search system 10 as embodiment 1 and embodiment 2, separately.

Embodiment 1

Figure 3:
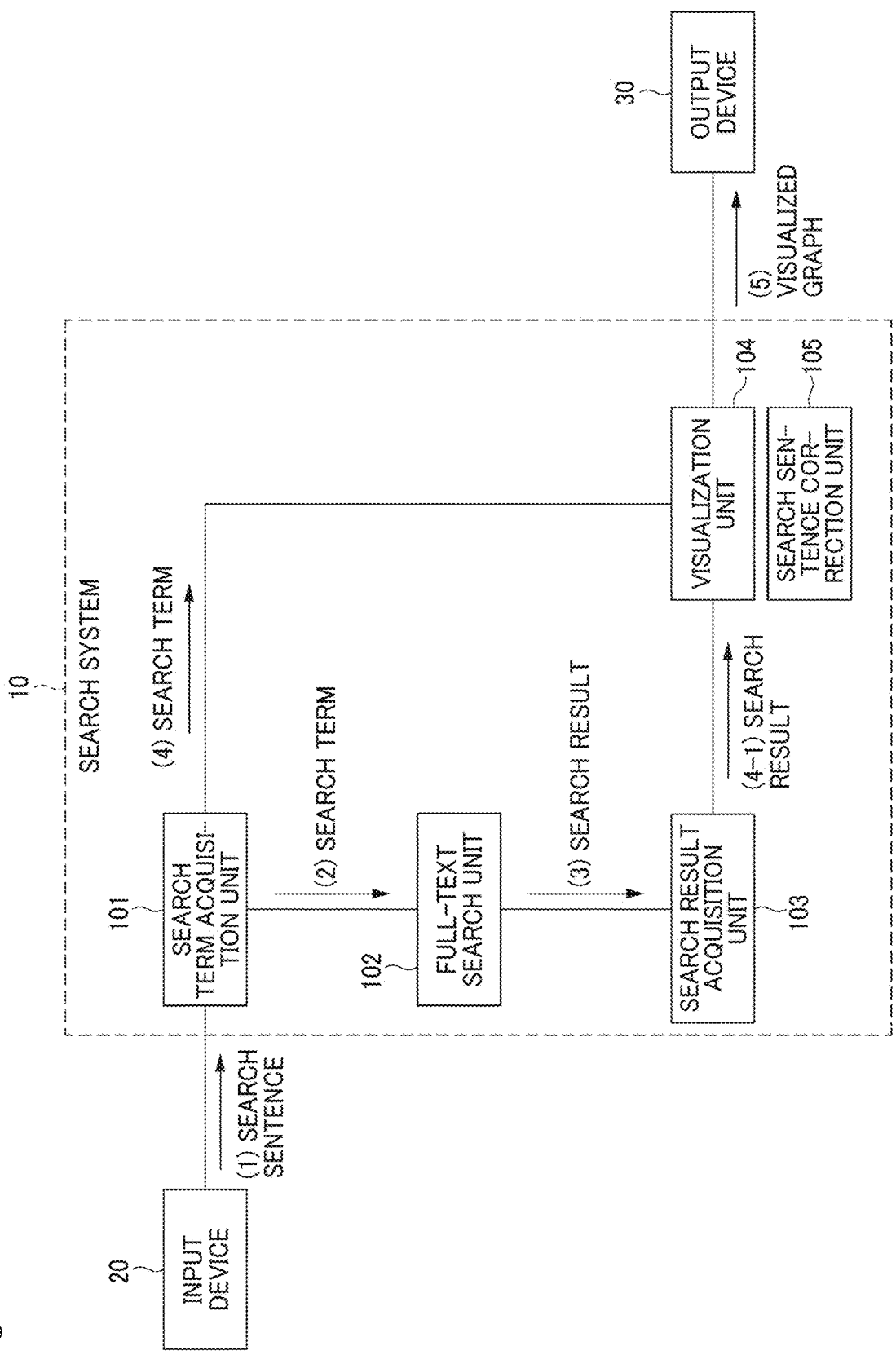
FIG. 3 is an example of configuration of functional block diagram of a search system according to embodiment 1 of this disclosure.

FIG. 3 is an example of configuration of functional block diagram of the search system 10 according to embodiment 1 of this disclosure. As illustrated in FIG. 3, the search system 10 includes, for example, search term acquisition unit 101, full-text search unit 102, search result acquisition unit 103, visualization unit 104, and search sentence correction unit 105. Further, the search system 10 can implement the search term acquisition unit 101, the full-text search unit 102, the search result acquisition unit 103, the visualization unit 104, and the search sentence correction unit 105 by executing one or more programs. Hereinafter, a description is given of each unit.

The search term acquisition unit 101 acquires a search term to be used for performing a searching operation.

Specifically, the search term acquisition unit 101 receives a natural sentence (i.e., search sentence) input by a user from the input device 20 (see (1) in FIG. 3). Then, the search term acquisition unit 101 divides the received search sentence into each word, and extracts the search term.

Then, the search term acquisition unit 101 stores the search term in a memory so that the full-text search unit 102 and the visualization unit 104 can refer to the search term (see (2) and (4) in FIG. 3).

Further, the search term acquisition unit 101 may acquire or obtain the search term by receiving the search term input by the user from the input device 20.

Then, the full-text search unit 102 performs a searching operation based on the search term. Specifically, the full-text search unit 102 uses the search term to generate a query to be used for performing the searching operation. Further, the full-text search unit 102 searches one or more documents to be searched (i.e., search target) based on the query. Further, the full-text search unit 102 stores a search result obtained by performing the searching operation in a memory so that the search result acquisition unit 103 can refer to the search result.

Then, the search result acquisition unit 103 acquires or obtains a search result obtained by performing the searching operation using the full-text search unit 102 (see (3) in FIG. 3), and then transmits the search result to the visualization unit 104 (see (4-1) in FIG. 3).

Then, the visualization unit 104 creates a graph that visualizes a corresponding relationship between the document and the search term (e.g., three or more search terms), and transmits the graph to the output device 30 (see (5) in FIG. 3).

The search sentence correction unit 105 corrects or modifies the query used for performing the searching operation (e.g., change, add, or delete of search term), and then performs a next searching operation based on the corrected or modified query.

Embodiment 2

Figure 4:
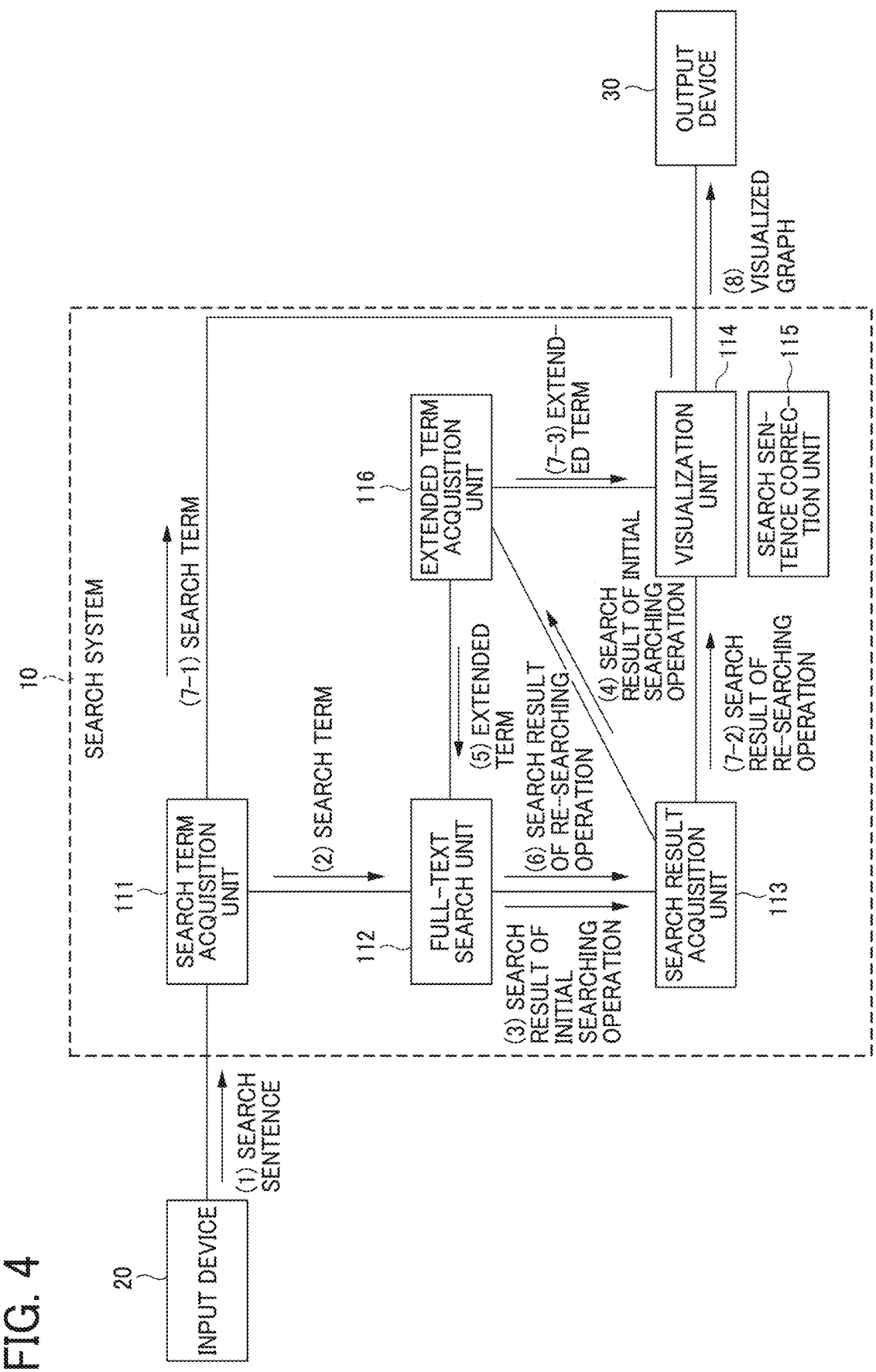
FIG. 4 is an example of configuration of functional block diagram of a search system according to embodiment 2 embodiment of this disclosure.

FIG. 4 is an example of configuration of functional block diagram of the search system 10 according to embodiment 2 of this disclosure.

In the above described embodiment 1, the searching operation is performed based on the search term extracted from the search sentence input by the user (or search term input by the user).

In embodiment 2, the searching operation is performed based on a search term (hereinafter, referred to as original search term or initial search term) and other search term derived from the original search term (hereinafter, referred to as extended term). Hereinafter, a combination of the original search term and the extended term may be referred to as a new search term.

The extended term is a term used for preparing a query for performing the searching operation of one or more documents requested by a user. For example, the extended term is a term extracted from a document that is extracted by performing the searching operation based on the original search term (hereinafter, referred to as initial searching operation) applying pseudo relevance feedback (PRF).

Further, the extended term may be various terms, such as synonym of the search term, term indicating upper-level (broader) concept of the search term, term indicating lower-level (narrower) concept of the search term, and term having co-occurrence relationship with the search term. For example, if a search term is "multifunctional machine," the synonym is "MFP," the term indicating upper-level concept is "office machine," the term indicating lower-level concept is "laser printer," and the term having co-occurrence relationship is "copy," "clogging," or the like.

As illustrated in FIG. 4, the search system 10 includes, for example, search term acquisition unit 111, full-text search unit 112, search result acquisition unit 113, visualization unit 114, search sentence correction unit 115, and extended term acquisition unit 116. Further, the search system 10 can implement the search term acquisition unit 111, the full-text search unit 112, the search result acquisition unit 113, the visualization unit 114, the search sentence correction unit 115, and the extended term acquisition unit 116 by executing one or more programs. Hereinafter, a description is given of each unit.

The search term acquisition unit 111 acquires a search term to be used for performing a searching operation. Specifically, the search term acquisition unit 111 receives a natural sentence (i.e., search sentence) input by a user from the input device 20 (see (1) in FIG. 4).

Then, the search term acquisition unit 111 divides the received search sentence into each word, and extracts the search term. Then, the search term acquisition unit 111 stores the search term in a memory so that the full-text search unit 112 and the visualization unit 114 can refer to the search term (see (2) and (7-1) in FIG. 4).

Further, the search term acquisition unit 111 may acquire or obtain the search term by receiving the search term input by the user from the input device 20.

The extended term acquisition unit 116 acquires or obtains an extended term. The extended term acquisition unit 116 will be described in detail later with reference to FIG. 6.

The full-text search unit 112 performs a searching operation based on the original search term (see FIG. 3), and also performs a searching operation based on the new search term (i.e., original search term and extended term). Specifically, the full-text search unit 112 uses the new search term (i.e., original search term and extended term) to generate a query to be used for performing the searching operation. Further, the full-text search unit 112 searches one or more documents to be searched (search target) based on the query. Further, the full-text search unit 112 stores a search result obtained by performing the searching operation in a memory so that the search result acquisition unit 113 can refer to the search result (see (3) and (6) in FIG. 4). The full-text search unit 112 will be described in detail later with reference to FIG. 5.

Then, the search result acquisition unit 113 acquires or obtains the search result obtained by performing the searching operation using the full-text search unit 112 (see (3) and (6) in FIG. 4), and then transmits the search result to the visualization unit 114 (see (7-2) in FIG. 4).

Then, the visualization unit 114 creates a graph that visualizes a corresponding relationship between the document and the new search term (e.g., three or more new search terms each composed of original search term and extended term), and transmits the graph to the output device 30 (see (8) in FIG. 4). The visualization unit 114 will be described in detail later with reference to FIG. 7.

Then, the search sentence correction unit 115 corrects or modifies the query used for performing the searching operation (e.g., change, add, or delete of search term), and then performs a next searching operation based on the corrected or modified query.

Figure 5:
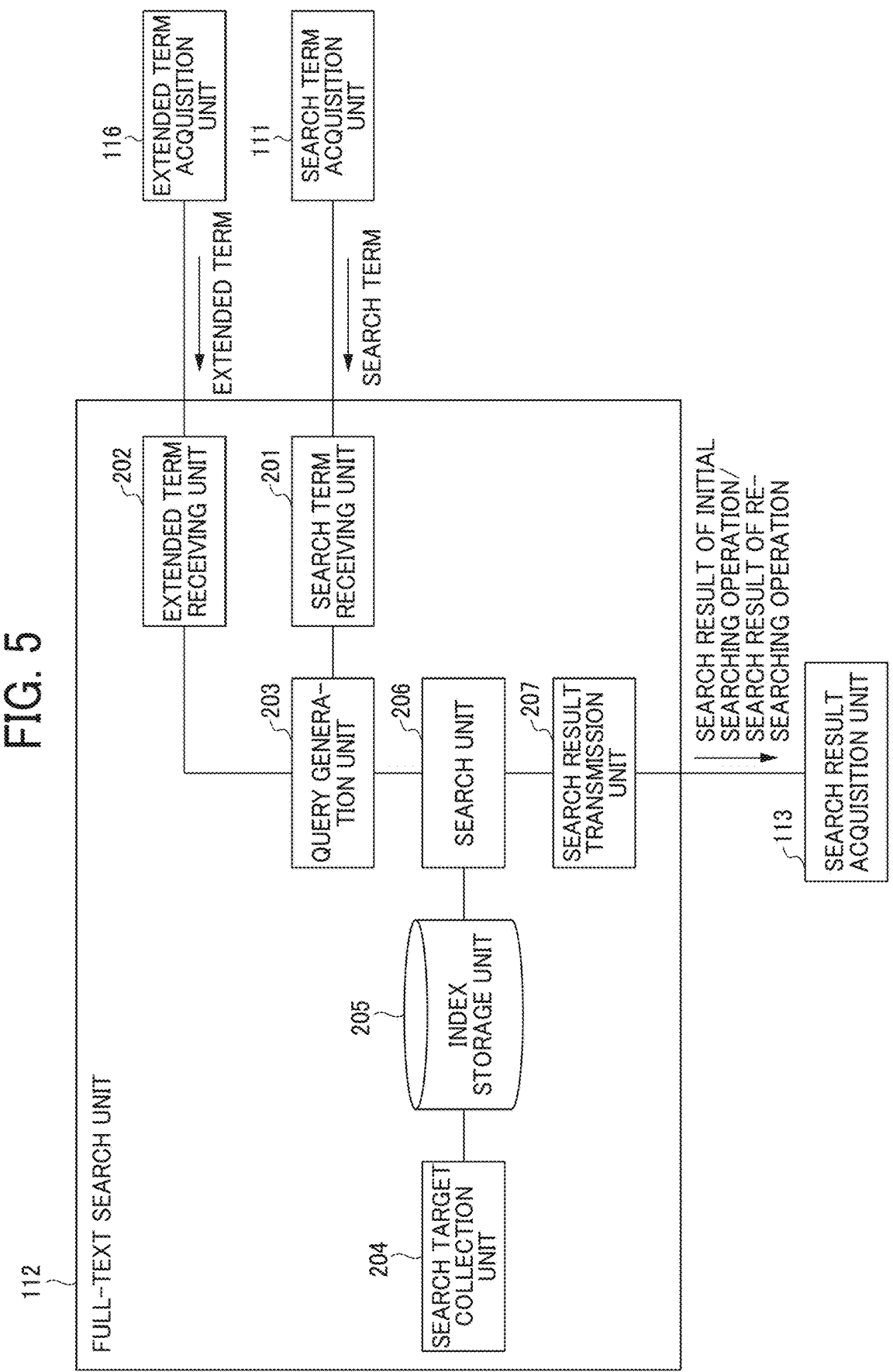
FIG. 5 is an example of configuration of functional block diagram of full-text search unit according to embodiment 2 of this disclosure.

FIG. 5 is an example of configuration of functional block diagram of the full-text search unit 112 according to embodiment 2 of this disclosure. The full-text search unit 112 includes, for example, search term receiving unit 201, extended term receiving unit 202, query generation unit 203, search target collection unit 204, index storage unit 205, search unit 206, search result transmission unit 207. Hereinafter, a description is given of each unit.

The search term receiving unit 201 receives a search term from the search term acquisition unit 111 (see (2) in FIG. 4).

The extended term receiving unit 202 receives an extended term from the extended term acquisition unit 116 (see (5) in FIG. 4).

The query generation unit 203 uses the search term (i.e., original search term) received by the search term receiving unit 201 and the extended term received by the extended term receiving unit 202 to generate a query to be used for performing the searching operation. For example, the query generation unit 203 connects or links the search term (i.e., original search term) and extended term, which may be weighted, using a search operator to generate a query to be used for performing the full-text searching.

Further, when to perform the initial searching operation, the query generation unit 203 uses the search term (i.e., original search term) received by the search term receiving unit 201 to generate the query to be used for performing the initial searching operation.

The search target collection unit 204 collects one or more documents that may become candidate of search result (i.e., search target), and stores the one or more documents in the index storage unit 205.

The index storage unit 205 stores the one or more documents (i.e., search target). The embodiments 1 and 2 can be applied for searching any document stored in the index storage unit 205, and can be applied for searching information available on the Internet, such as web pages and web sites.

The search unit 206 searches the document to be searched (i.e., search target) stored in the index storage unit 205 based on the query generated by the query generation unit 203, and sets or assigns ranking for each document. For example, the search unit 206 uses a method (e.g., Okapi BM25) to rank documents extracted by performing the searching operation in accordance with relevance between the query and each document.

The search result transmission unit 207 transmits a result obtained by performing the searching operation by the search unit 206 to the search result acquisition unit 113 (see (3) and (6) in FIG. 4). For example, the search result transmission unit 207 transmits the search result (i.e., document information extracted by performing the searching operation, and the ranking of each document) to the search result acquisition unit 113.

Further, in a case of embodiment 1, since the full-text search unit 102 does not receive the extended term, the full-text search unit 102 performs the searching operation based on the search term received from the search term acquisition unit 101 alone.

Figure 6:
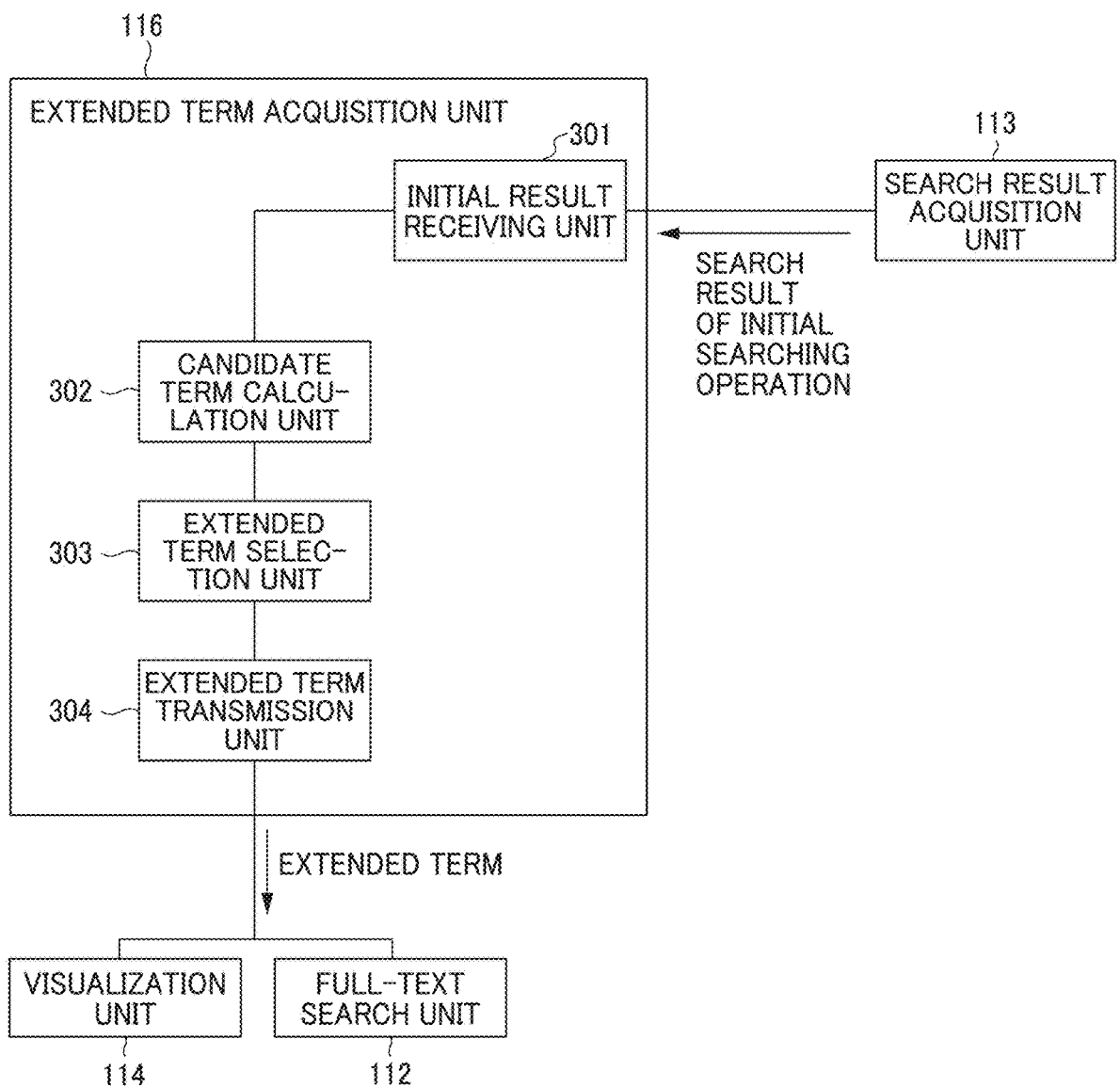
FIG. 6 is an example of configuration of functional block diagram of extended term acquisition unit according to embodiment 2 of this disclosure.

FIG. 6 is an example of configuration of functional block diagram of the extended term acquisition unit 116 according to embodiment 2 of this disclosure. The extended term acquisition unit 116 includes, for example, initial result receiving unit 301, candidate term calculation unit 302, extended term selection unit 303, and extended term transmission unit 304. Hereinafter, a description is given of each unit.

The initial result receiving unit 301 receives a result obtained by performing the initial searching operation (i.e., searching operation using the original search term) from the search result acquisition unit 113 (see (4) in FIG. 4). For example, the initial result receiving unit 301 receives information on the document extracted by performing the initial searching operation applying pseudo relevance feedback (PRF).

The candidate term calculation unit 302 extracts one or more candidates of extended term based on the result of the initial searching operation received by the initial result receiving unit 301, and sets or assigns a ranking to each candidate of extended term.

The extended term selection unit 303 selects a given number of extended terms ranked at a higher level (e.g., the number may be designated by a user, or pre-set number) among the one or more candidates of extended term ranked by the candidate term calculation unit 302.

The extended term transmission unit 304 transmits the extended term selected by the extended term selection unit 303 to the full-text search unit 112 and the visualization unit 114 (see (5) and (7-3) in FIG. 4).

Figure 7:
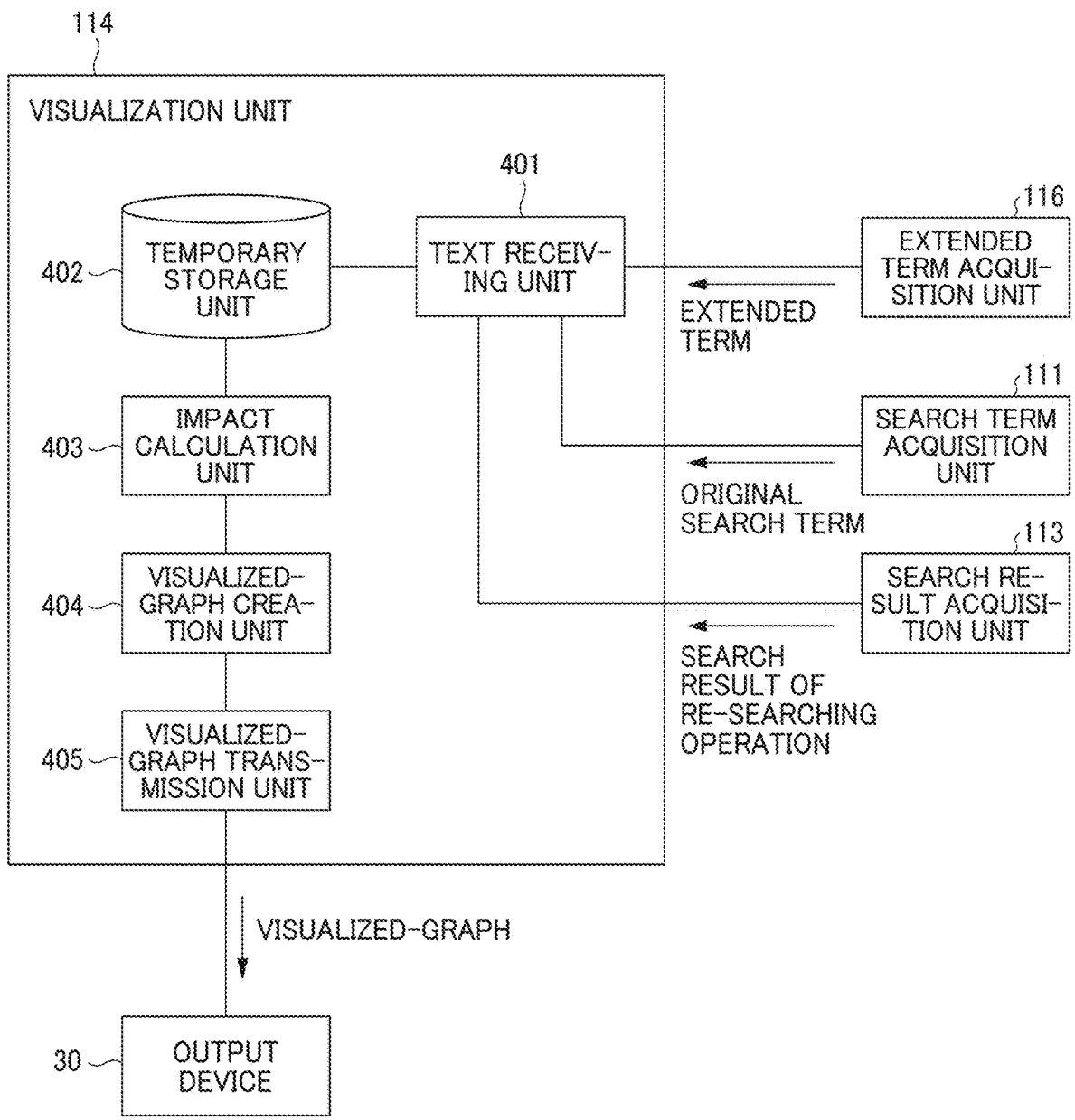
FIG. 7 is an example of configuration of functional block diagram of visualization unit according to embodiment 2 of this disclosure.

FIG. 7 is an example of configuration of functional block diagram of the visualization unit 114 according to embodiment 2 of this disclosure. The visualization unit 114 includes, for example, text receiving unit 401, temporary storage unit 402, impact calculation unit 403, visualized-graph creation unit 404, and visualized-graph transmission unit 405. Hereinafter, a description is given of each unit.

The text receiving unit 401 receives information on the extended term from the extended term acquisition unit 116, and stores the information on the extended term in the temporary storage unit 402. Further, the text receiving unit 401 receives information on the original search term (i.e., the search term used for deriving the extended term) from the search term acquisition unit 111, and stores the information on the original search term in the temporary storage unit 402. Further, the text receiving unit 401 receives a search result from the search result acquisition unit 113, and stores the search result in the temporary storage unit 402. The search result includes the information on the document extracted by performing the searching operation based on the original search term and the extended term, and the ranking of each document (see (7-2) in FIG. 4).

The temporary storage unit 402 stores the information on the extended term, the information on the original search term, and the search result received by the text receiving unit 401.

The impact calculation unit 403 calculates the impact (e.g., the number of appearing frequency, vector similarity) of the new search term (i.e., original search term and extended term) for each document extracted by performing the searching operation.

The visualized-graph creation unit 404 creates a graph representing a degree of impact using a visual indicator, such as distance and size, based on the impact calculated by the impact calculation unit 403.

The visualized-graph transmission unit 405 transmits the graph created by the visualized-graph creation unit 404 to the output device 30 (see (8) in FIG. 4).

In a case of embodiment 1, since the visualization unit 104 does not receive the extended term, the visualization unit 104 creates the graph based on the search term acquired or obtained from the search term acquisition unit 101, and the search result received from the search result acquisition unit 103.

(Data Configuration Information)

FIG. 8 is an example of data configuration information of search target according to embodiments 1 and 2 of this disclosure. The index storage unit 205 stores data of search target as illustrated in FIG. 8. As illustrated in FIG. 8, the index storage unit 205 stores various information, such as identifier or identification of document (e.g., document ID), document title, and document content (e.g., text). The document is, for example, the minutes, report, daily memo accumulated by a user. The document content (e.g., text) becomes the search target.

FIG. 9 is an example of data configuration information of search sentence and search result according to embodiment 2 of this disclosure. The temporary storage unit 402 stores data of search sentence and search result as illustrated in FIG. 9. FIG. 9 is an example of data configuration information used for embodiment 2. As illustrated in FIG. 9, the temporary storage unit 402 stores the new search term (i.e., original search term and extended term), weight of each new search term, and search result obtained by using a query generated using the new search term (i.e., information on document extracted by performing the searching operation using the original search term and the extended term, and ranking of each document).

In a case of embodiment 1, since the extended term is not stored, the search term and search result are stored.

Hereinafter, a description is given of weighting of the original search term and the extended term. In embodiment 2 of this disclosure, the searching operation can be performed by setting a weight to the original search term and a weight to the extended term. The weight may be a value specified or designated by a user, or may be a pre-set value. Further, the same weight can be set to all of the original search terms, or the weight can be set to each of the original search terms differently. Further, the same weight can be set to all of the extended terms, or the weight can be set to each of the extended terms differently.

FIG. 10 is an example of data configuration information of impact of search term according to embodiment 2 of this disclosure. The impact calculation unit 403 calculates the impact of search term indicated in FIG. 10. FIG. 10 is an example of data configuration information used for embodiment 2.

As illustrated in FIG. 10, the impact calculation unit 403 calculates the impact of new search term (i.e., original search term and extended term) on each document extracted by performing the searching operation. For example, the impact is, for example, the number of times that the new search term (i.e., original search term and extended term) appears in each document (i.e., the appearing number of the new search term, such as the number of appearing frequency of the new search term), and the similarity level (i.e., vector similarity) of each document and the new search term (i.e., original search term and the extended term).

In a case of embodiment 1, since the impact of extended term is not calculated, the impact of search term alone is calculated.

(Method of Processing)

Hereinafter, a description is given of sequence of the search processing performed by the search system 10 for embodiment 1 and embodiment 2, separately.

Figure 11:
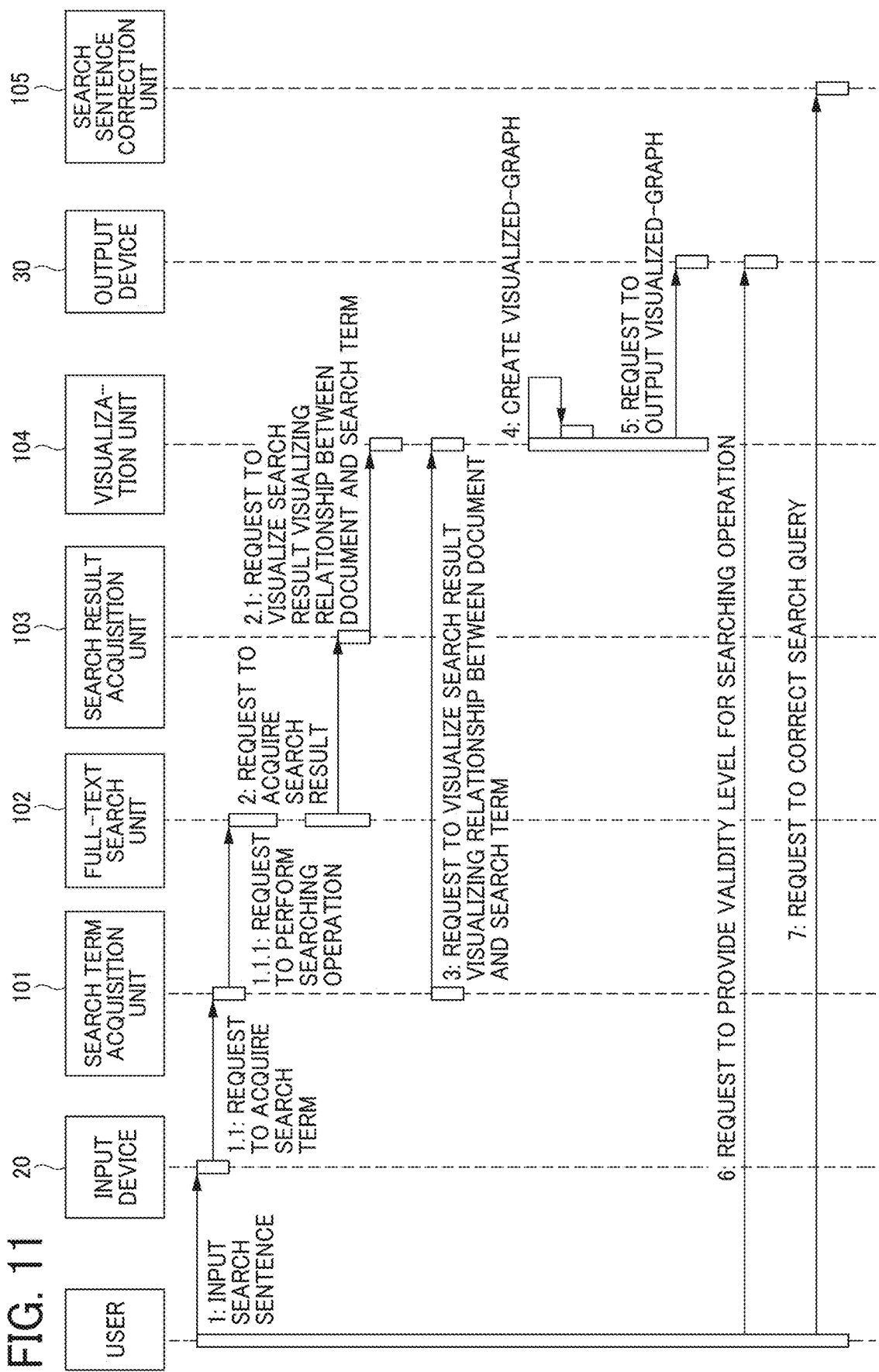
FIG. 11 is a sequence diagram of a search processing according embodiment 1 of this disclosure.

FIG. 11 is a sequence diagram of a search processing according embodiment 1 of this disclosure.

A user inputs a natural sentence (i.e., search sentence) to the input device 20 (1). Then, the input device 20 requests the search term acquisition unit 101 to acquire a search term (1.1).

Then, the search term acquisition unit 101 requests the full-text search unit 102 to perform a searching operation (1.1.1).

Then, the full-text search unit 102 requests the search result acquisition unit 103 to acquire a result of the searching operation (2).

Then, the search result acquisition unit 103 requests the visualization unit 104 to create a graph that visualizes a corresponding relationship between the document and the search term (2.1).

Then, the search term acquisition unit 101 requests the visualization unit 104 to create a graph that visualizes a corresponding relationship between the document and the search term (3).

Then, the visualization unit 104 creates the graph (4).

Then, the visualization unit 104 requests the output device 30 to output the graph (5).

Then, the user requests the output device 30 to provide validity level for the searching operation (6).

Then, the user uses the output device 30 to instruct the search sentence correction unit 105 to correct or modify the query used for the searching operation to perform a next searching operation (7).

Figure 12:
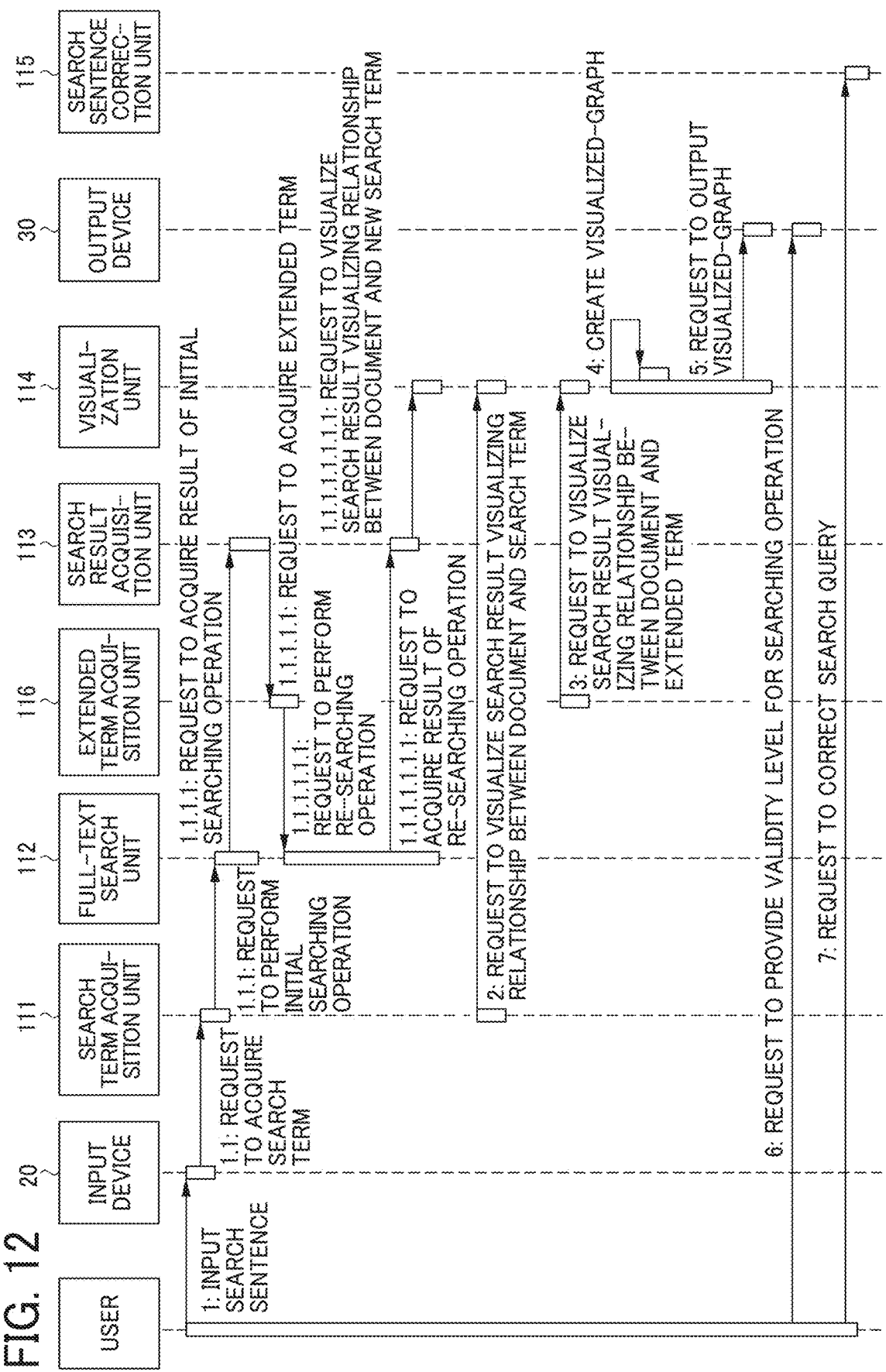
FIG. 12 is a sequence diagram of search processing according to embodiment 2 of this disclosure.

FIG. 12 is a sequence diagram of search processing according to embodiment 2 of this disclosure.

A user inputs a natural sentence (i.e., search sentence) to the input device 20 (1).

Then, the input device 20 requests the search term acquisition unit 111 to acquire a search term (1.1).

Then, the search term acquisition unit 111 requests the full-text search unit 112 to perform an initial searching operation (i.e., searching operation based on the original search term) (1.1.1).

Then, the full-text search unit 112 requests the search result acquisition unit 113 to acquire a result of the initial searching operation (1.1.1.1).

Then, the search result acquisition unit 113 requests the extended term acquisition unit 116 to acquire an extended term (1.1.1.1.1).

Then, the extended term acquisition unit 116 requests the full-text search unit 112 to perform a re-searching operation (i.e., searching operation based on the original search term and the extended term) (1.1.1.1.1.1).

Then, the full-text search unit 112 requests the search result acquisition unit 113 to acquire a result of re-searching operation (1.1.1.1.1.1.1).

Then, the search result acquisition unit 113 requests the visualization unit 114 to create a graph that visualizes a corresponding relationship between the document and the new search term (i.e., original search term and extended term) (1.1.1.1.1.1.1.1).

Then, the search term acquisition unit 111 requests the visualization unit 114 to create a graph that visualizes a corresponding relationship between the document and the original search term (2).

Then, the extended term acquisition unit 116 requests the visualization unit 114 to create a graph that visualizes a corresponding relationship between the document and the extended term (3).

Then, the visualization unit 114 creates the graph (4).

Then, the visualization unit 114 requests the output device 30 to output the graph (5).

Then, the user requests the output device 30 to provide validity level for the searching operation (6).

Then, the user uses the output device 30 to instruct the search sentence correction unit 115 to correct or modify the query used for the searching operation to perform a next searching operation (7).

Hereinafter, with reference to FIG. 13, a description is given of flowchart of search processing of the search system 10 as embodiment 1 and embodiment 2, separately.

Figure 13:
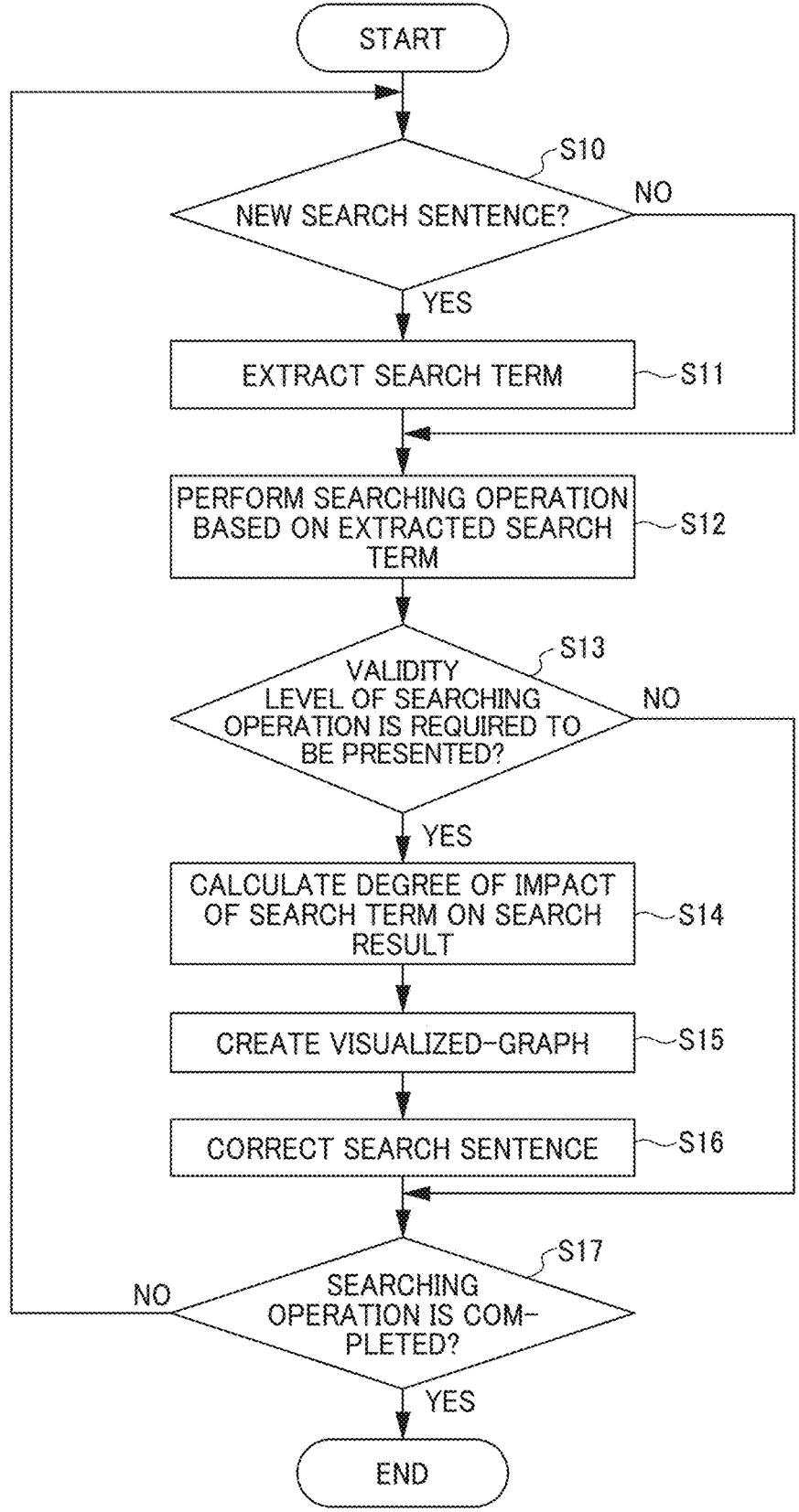
FIG. 13 is a flowchart of a search processing according to embodiment 1 of this disclosure.

FIG. 13 is a flowchart of a search processing according to embodiment 1 of this disclosure.

In step S10, the search term acquisition unit 101 determines whether a search sentence received from the input device 20 is a new search sentence. Specifically, the search term acquisition unit 101 determines whether or not the search sentence received from the input device 20 has been received previously or in the past.

If the search term acquisition unit 101 determines that the search sentence received from the input device 20 is the new search sentence (step S10: YES), the sequence proceeds to step S11. If the search term acquisition unit 101 determines that the search sentence received from the input device 20 is not the new search sentence (step S10: NO), the sequence proceeds to step S12.

Further, the system can be configured to extract the search term from all of the search sentences without performing step S10 determining whether or not the received search sentence is the new search sentence.

In step S11, the search term acquisition unit 101 extracts a search term from the search sentence received in step S10.

In step S12, the full-text search unit 102 performs a searching operation based on the search term extracted in step S11 (or the search term extracted previously or in the past).

In step S13, the visualization unit 104 determines whether or not validity level of the searching operation is required to be presented. Specifically, the visualization unit 104 determines whether or not the user has requested to provide the validity level for the searching operation via the output device 30.

If the visualization unit 104 determines that the validity level of the searching operation is required to be presented (step S13: YES), the sequence proceeds to step S14. If the visualization unit 104 determines that the validity level of the searching operation is not required to be presented (step S13: NO), the sequence proceeds step S17.

In step S14, the visualization unit 104 calculates the impact of the search term on each document extracted by performing the searching operation, such as the number of appearing frequency and vector similarity.

In step S15, the visualization unit 104 creates a graph representing a degree of impact using a visual indicator, such as distance and size, based on the impact calculated in step S14.

In step S16, the search sentence correction unit 105 corrects or modifies the query used for performing the searching operation (e.g., change, add, or delete of search term), and then performs a next searching operation based on the corrected or modified query.

In step S17, the search sentence correction unit 105 determines whether or not the searching operation has been completed. If the search sentence correction unit 105 determines that the searching operation has been completed (step S17: YES), the sequence ends. If the search sentence correction unit 105 determines that the searching operation has not been completed (step S17: NO), the sequence returns to step S10.

Figure 14:
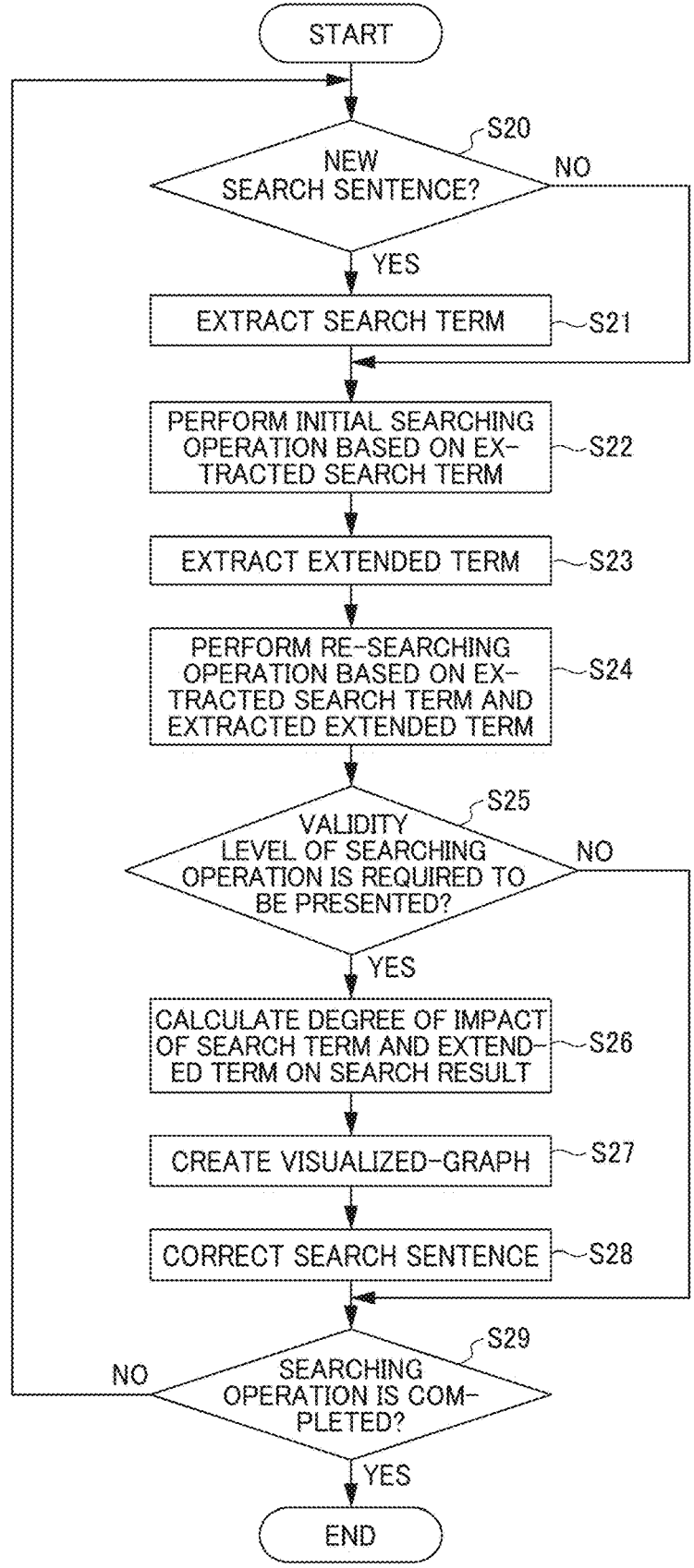
FIG. 14 is a flowchart of a search processing according to embodiment 2 of this disclosure.

FIG. 14 is a flowchart of a search processing according to embodiment 2 of this disclosure.

In step S20, the search term acquisition unit 111 determines whether a search sentence received from the input device 20 is a new search sentence. Specifically, the search term acquisition unit 111 determines whether or not the search sentence received from the input device 20 has been received previously or in the past.

If the search term acquisition unit 111 determines that the search sentence received from the input device 20 is the new search sentence (step S20: YES), the sequence proceeds to step S21. If the search term acquisition unit 111 determines that the search sentence received from the input device 20 is not the new search sentence (step S20: NO), the sequence proceeds to step S22.

Further, the system can be configured to extract the search term from all of the search sentences without performing step S20 determining whether or not the received search sentence is the new search sentence.

In step S21, the search term acquisition unit 111 extracts a search term (i.e., original search term or initial search term) from the search sentence received in step S20.

In step S22, the full-text search unit 112 performs an initial searching operation based on the search term extracted in step S21 (or the search term extracted previously or in the past).

In step S23, the extended term acquisition unit 116 extracts an extended term from the document extracted by performing the initial searching operation in step S22.

In step S24, the full-text search unit 112 performs a re-searching operation based on the search term extracted in step S21 (or the search term extracted previously or in the past) and the extended term extracted in step S23.

In step S25, the visualization unit 114 determines whether or not validity level of the searching operation is required to be presented. Specifically, the visualization unit 114 determines whether or not the user has requested to provide the validity level for the searching operation via the output device 30.

If the visualization unit 114 determines that the validity level of the searching operation is required to be presented (step S25: YES), the sequence proceeds to step S26. If the visualization unit 104 determines that the validity level of the searching operation is not required to be presented (step S25: NO), the sequence proceeds step S29.

In step S26, the visualization unit 114 calculates the impact of the search term (i.e., original search term) and the impact of the extended term on each document extracted by performing the re-searching operation, such as the number of appearing frequency and vector similarity.

In step S27, the visualization unit 114 creates a graph representing a degree of impact using a visual indicator, such as distance and size, based on the impact of the search term (i.e., original search term) and the impact of the extended term calculated in step S26.

In step S28, the search sentence correction unit 115 corrects or modifies the query used for performing the searching operation (e.g., change, add, or delete of search term), and then performs a next searching operation based on the corrected or modified query.

In step S29, the search sentence correction unit 115 determines whether or not the searching operation has been completed. If the search sentence correction unit 115 determines that the searching operation has been completed (step S29: YES), the sequence ends. If the search sentence correction unit 115 determines that the searching operation has not been completed (step S29: NO), the sequence returns to step S20.

Hereinafter, with reference to FIG. 15, a description is given of example of screen displayed on the input device 20 and the output device 30.

Figure 15:
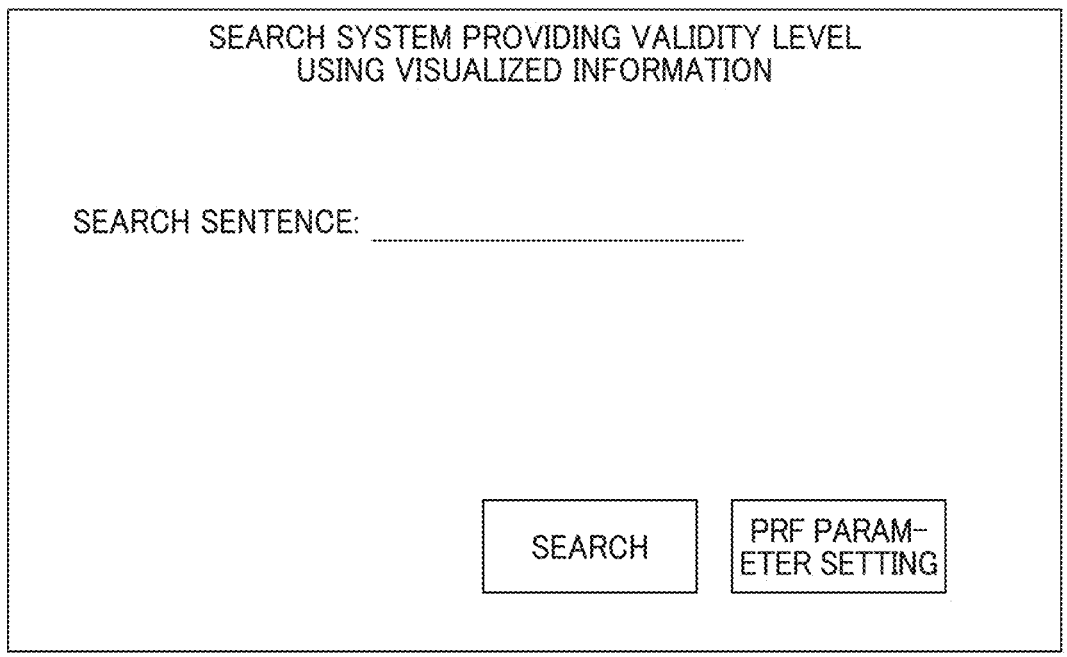
FIG. 15 is an example of an input screen according to embodiments 1 and 2 of this disclosure.

FIG. 15 is an example of an input screen according to embodiments 1 and 2 of this disclosure. A user can input a search sentence using the input screen displayed on the input device 20. If a search button (FIG. 15) is pressed, the searching operation is performed. Further, if a PRF parameter setting button (FIG. 15) is pressed, the input screen shifts to another screen used for setting the weight on the original search term and the extended term.

Figure 16:
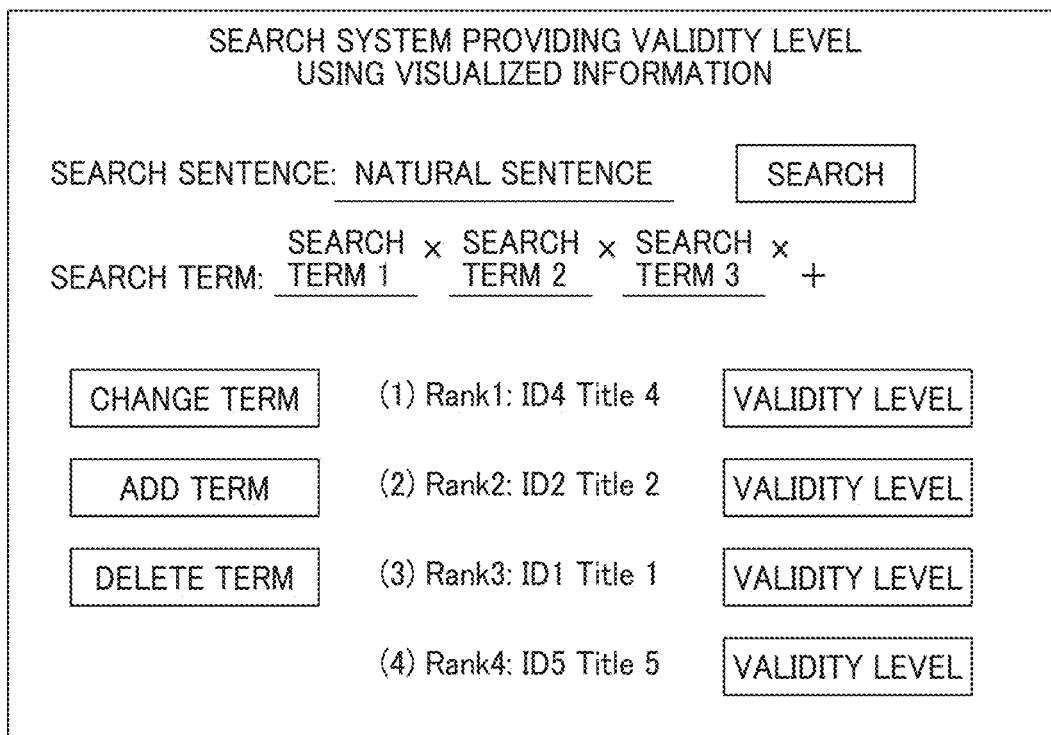
FIG. 16 is an example of screen of search result list according to embodiment 1 of this disclosure.

FIG. 16 is an example of screen of search result list according to embodiment 1 of this disclosure. A user can confirm a search result on a screen of search result list displayed on the output device 30. As illustrated in FIG. 16, the search result list displays the search term extracted from the search sentence, and the search result (i.e., information on document extracted by performing the searching operation, and ranking of each document).

Figure 17:
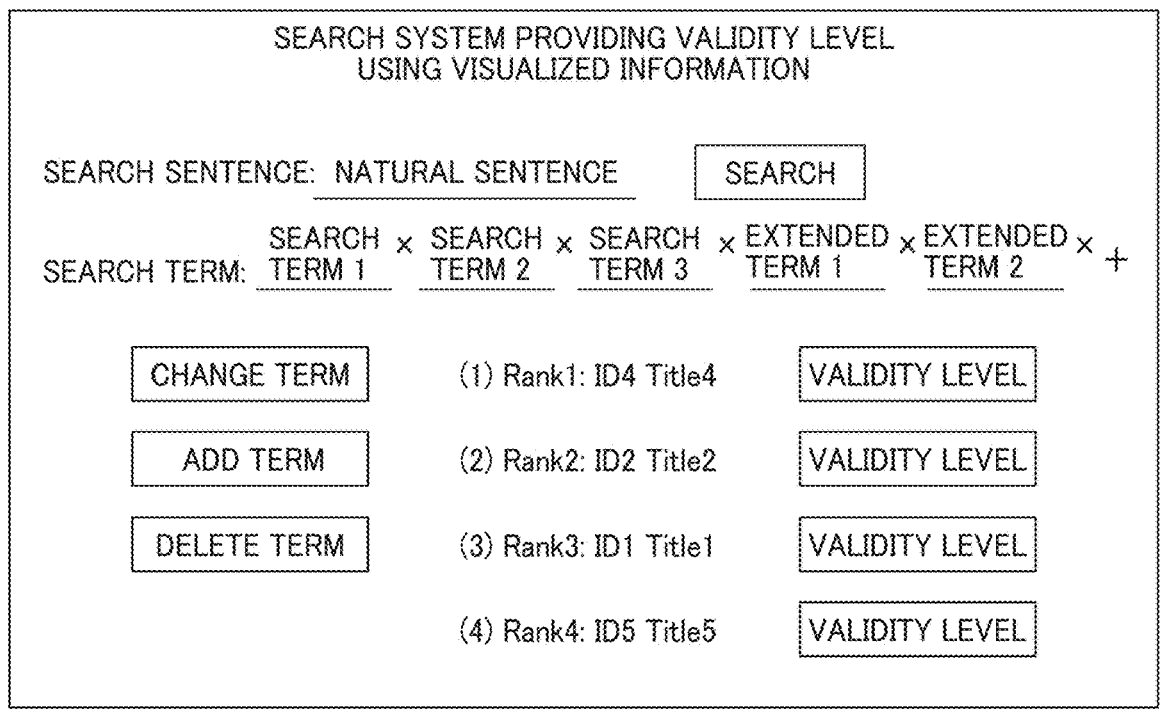
FIG. 17 is an example of screen of search result list according to embodiment 2 of this disclosure.

FIG. 17 is an example of screen of search result list according to embodiment 2 of this disclosure. A user can confirm a search result on a screen of search result list displayed on the output device 30. As illustrated in FIG. 17, the search result list displays the search term (i.e., original search term) extracted from the search sentence, the extended term extracted from the document extracted by performing the initial searching operation, and the search result (i.e., information on each document extracted by performing the searching operation based on the original search term and extended term, and ranking of each document).

Hereinafter, with reference to FIGS. 16 and 17, a description is given of correction of query used for searching operation. For example, the screen of search result list (FIGS. 16 and 17) can be configured to display buttons for correcting or modifying the query, such as a button for changing a search term, a button for adding a search term, and a button for deleting a search term. If any one of the buttons is pressed, the search sentence correction units 105 or 115 corrects or modifies the query used for performing the searching operation (e.g., change, add, or delete of search term), and then performs a next searching operation based on the corrected or modified query.

Figure 18:
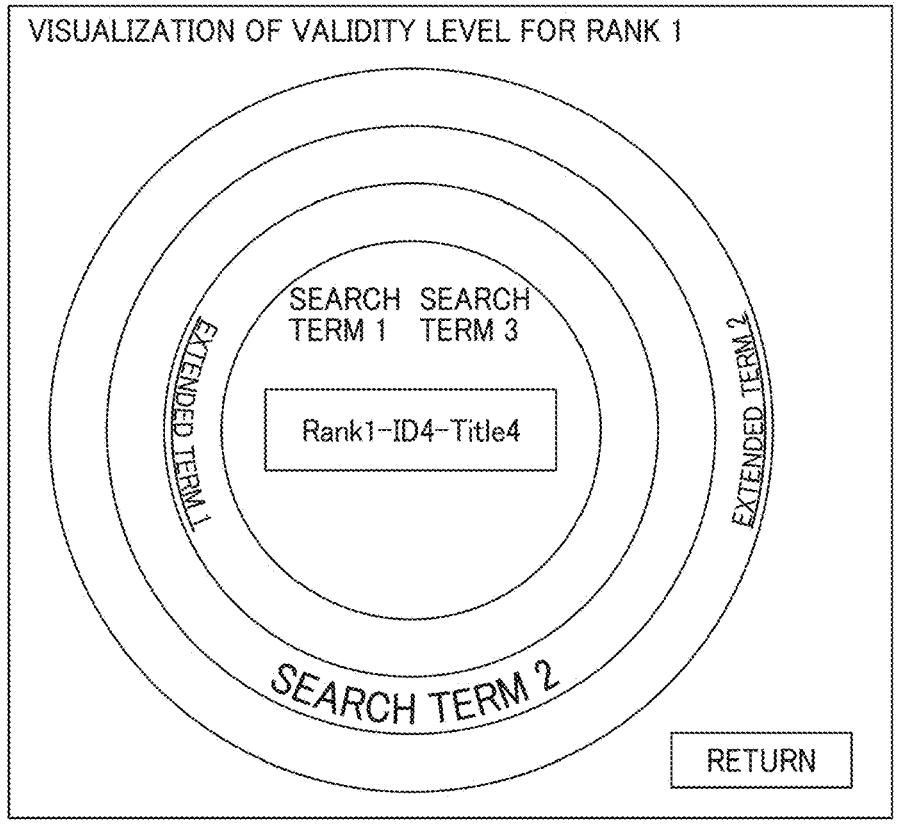
FIG. 18 is an example of screen of visualizing validity level of search result according to embodiment 2 of this disclosure.

FIG. 18 is an example of screen of visualizing validity level of search result according to embodiment 2 of this disclosure. For example, when the validity level button of each document (see FIGS. 16 and 17) is pressed, a graph visualizing a corresponding relationship between each document and each new search term (i.e., original search term and extended term) is displayed as illustrated in FIG. 18. In a case of embodiment 1, the extended term is not displayed.

As illustrated in FIG. 18, the document rank, document ID, and title are displayed at the center of concentric circles, and the new search term (i.e., original search term and extended term) included in the query used for the searching operation that has extracted the concerned document is displayed at a particular position in the concentric circles. Hereinafter, a description is given of method of creating a graph performed by the visualization unit 114 (104) in detail. The visualization units 104 and 114 perform similar processing while the visualization unit 104 performs specific processing for embodiment 1 and the visualization unit 114 performs specific processing for embodiment 2, which may differ.

(1) The visualization unit 114 (104) creates two or more shapes that share the center (e.g., concentric circles). For example, the concentric circles are arranged at equal intervals.

(2) The visualization unit 114 (104) places the original search term and the extended term at a particular position in the concentric circles based on the vector similarity of the original search term and the extended term. Specifically, the higher the vector similarity of the original search term and the extended term, the visualization unit 114 (104) places the original search term and the extended term at a particular position closer to the center. In a case of embodiment 1, the visualization unit 104 processes the original search term alone.

Specifically, the visualization unit 114 (104) places the original search term and the extended term existing in a given range of vector similarity in each region between one circle and the next circle. For example, the original search terms or the extended terms having the vector similarity of "0 to 0.05," "0.05 to 0.10," and "0.10 to 0.15" are placed in this order from the outer region. That is, the original search terms or the extended terms having the vector similarity of the same range are placed in the same region. Further, the visualization unit 114 (104) determines the position of layout within each region based on the similarity level of the original search term and the extended term.

(3) The visualization unit 114 (104) displays the original search term and the extended term by changing a display style based on the number of appearing frequency of the original search term and the extended term. Specifically, the greater the number of appearing frequency of the original search term and the extended term, the visualization unit 114 (104) displays the original search term and the extended term with a greater character size.

(4) The visualization unit 114 (104) displays the original search term and the extended term in a distinguished manner by changing a display style. For example, the visualization unit 114 (104) sets a underline for the extended term, or displays the original search term and the extended term using different colors.

Figure 19:
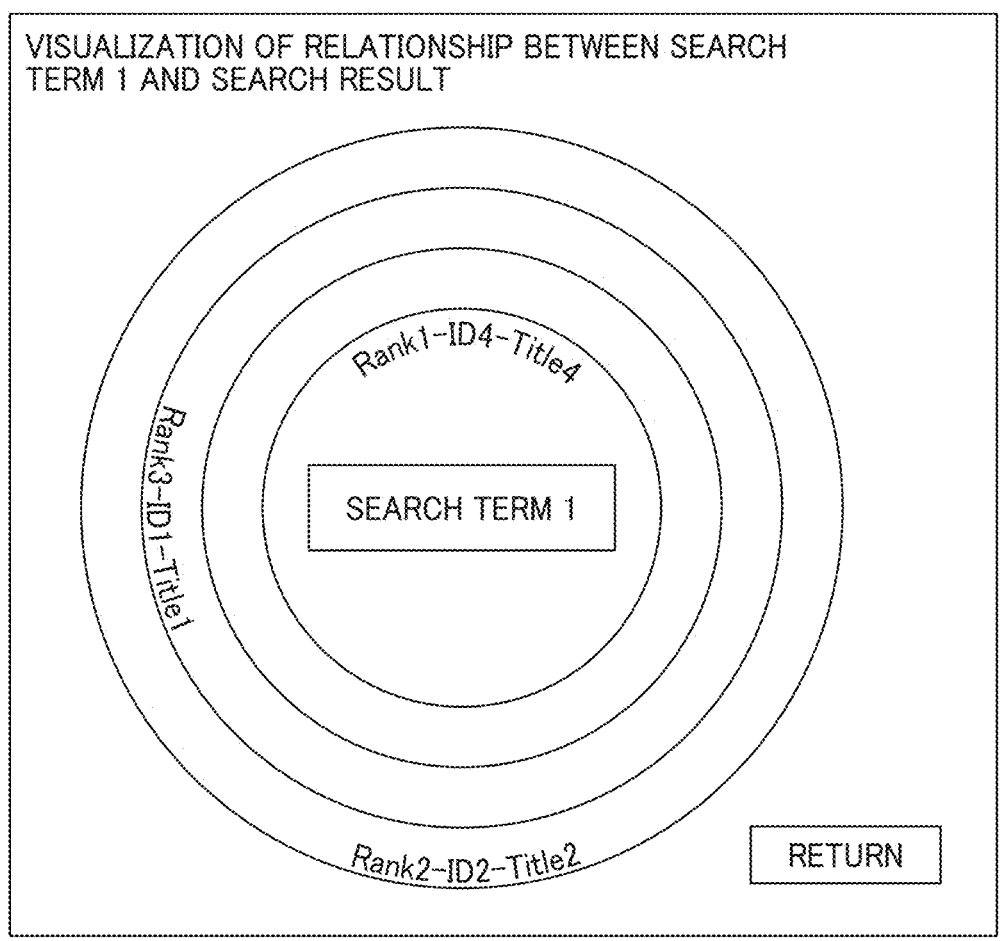
FIG. 19 is an example of screen visualizing a corresponding relationship between search term and search result according to embodiment 2 of this disclosure.

FIG. 19 is an example of screen visualizing a corresponding relationship between search term and search result according to embodiment 2 of this disclosure. For example, when the search term button or the extended term button (see FIGS. 16 and 17) is pressed, a graph visualizing a corresponding relationship between each document and each new search term (i.e., original search term and extended term) is displayed as illustrated in FIG. 19. In a case of embodiment 1, the extended term is not displayed.

As illustrated in FIG. 19, the search term or the extended term is displayed at the center of concentric circles, and each document extracted based on a query used for searching operation including the original search term and the extended term is displayed at a particular position in concentric circles. Hereinafter, a description is given of method of creating a graph performed by the visualization unit 114 (104) in detail.

(1) The visualization unit 114 (104) creates two or more shapes that share the center (e.g., concentric circles). For example, the concentric circles are arranged at equal intervals.

(2) The visualization unit 114 (104) places each document at a particular position in the concentric circles based on the vector similarity with the original search term and the extended term. Specifically, the higher the vector similarity with the original search term and the extended term, the visualization unit 114 (104) places each document at a particular position closer to the center. In a case of embodiment 1, the visualization unit 104 processes the original search term alone.

Specifically, the visualization unit 114 (104) places each document existing in a given range of vector similarity in each region between one circle and the next circle. For example, the documents having the vector similarity of "0 to 0.05," "0.05 to 0.10," and "0.10 to 0.15" are placed in this order from the outer region. That is, the documents having the vector similarity of the same range are placed in the same region. Further, the visualization unit 114 (104) determines the position of layout within each region based on the similarity level of the documents.

(3) The visualization unit 114 (104) displays the document by changing a display style based on the number of appearing frequency of the original search term and the extended term. Specifically, the greater the number of appearing frequency of the original search term and the extended term, the visualization unit 114 (104) displays the document with a greater character size.

Figure 20:
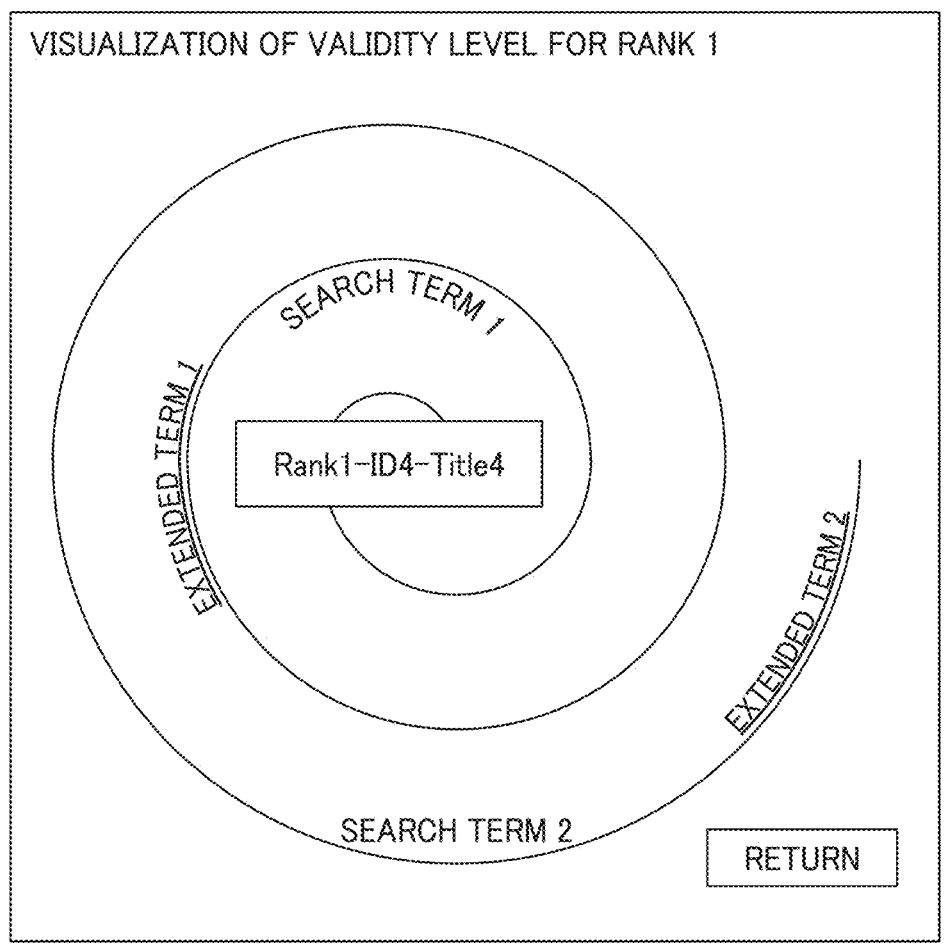
FIG. 20 is another example of screen of visualizing validity level of search result according to embodiment 2 of this disclosure.

FIG. 20 is another example of screen of visualizing validity level of search result according to embodiment 2 of this disclosure. In embodiment 2 of this disclosure, instead of the concentric circles illustrated in FIGS. 18, 19, and 21, a graph visualizing a corresponding relationship between each document and each new search term (i.e., original search term and extended term) using the spiral of Archimedes can be displayed. As to the spiral of Archimedes, since the distance to the center can be set more finely, the corresponding relationship between the document and the new search term (i.e., original search term and extended term) can be displayed with more easily understandable style.

Further, when the spiral of Archimedes is used, the number of appearing frequency of new search term (i.e., original search term and extended term) can be expressed by setting or changing the size of characters of new search term. Further, when the spiral of Archimedes is used, the new search term (i.e., original search term and extended term) can be expressed in a distinguished manner.

FIG. 21 is an example of screen used for comparing visualized validity level of search results according to embodiment 2 of this disclosure. For example, when a plurality of validity level buttons (e.g., two buttons) are pressed (see FIGS. 16 and 17), a screen used for comparing the visualized validity level of search results is displayed as illustrated in FIG. 21. When the validity level button of each document is pressed, a graph visualizing a corresponding relationship between each document and each new search term (i.e., original search term and extended term) is displayed as illustrated in FIG. 21. With this configuration, a user can compare the corresponding relationship between the document and new search term (i.e., original search term and extended term) for a plurality of documents.

As above described, FIGS. 18 to 21 illustrate examples of display patterns used for displaying the result obtained by performing the searching operation and the search term used for the searching operation.

As to the above described embodiments 1 and 2, the corresponding relationship between each document and each search term can be visualized, and the corresponding relationship between each document and each new search term (i.e., original search term and extended term) can be visualized. With this configuration, users can correct or modify the search term based on the corresponding relationship to improve the precision of searching operation.

Further, each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. The programs used for performing the above described embodiments can be stored in carrier means or storage medium.

Each of the embodiments described above is presented as just examples, and it is not intended to limit the scope of this disclosure. Numerous additional modifications and variations are possible in light of the above teachings. It is therefore to be understood that, within the scope of the appended claims, the disclosure of this specification can be practiced otherwise than as specifically described herein.

This patent application is based on and claims priority pursuant to Japanese Patent Application No. 2019-215838 filed on Nov. 28, 2019 in the Japan Patent Office, the entire disclosure of which is hereby incorporated by reference herein.

REFERENCE SIGNS LIST

10 Search System
20 Input Device
30 Output Device
40 Network
101 Search Term Acquisition Unit
102 Full-Text Search Unit
103 Search Result Acquisition Unit
104 Visualization Unit
105 Search Sentence Correction Unit
111 Search Term Acquisition Unit
112 Full-Text Search Unit
113 Search Result Acquisition Unit
114 Visualization Unit
115 Search Sentence Correction Unit
116 Extended Term Acquisition Unit
201 Search Term Receiving Unit
202 Extended Term Receiving Unit
203 Query Generation Unit
204 Search Target Collection Unit
205 Index Storage Unit
206 Search Unit
207 Search Result Transmission Unit
301 Initial Result Receiving Unit
302 Candidate Term Calculation Unit
303 Extended Term Selection Unit
304 Extended Term Transmission Unit

The invention claimed is:

1. A search system comprising:
at least one processor configured to:
acquire a search term;
perform a searching operation based on the search term;
display a corresponding relationship between the search term and a result obtained by performing the searching operation; and
display a display pattern including
the result at the center of the display pattern and displaying the search term at a particular position in the display pattern, and
the search term at a position closer to the center as a similarity level of the search term and the result is higher.

2. The search system of claim 1,
wherein the search term includes an original search term, and an extended term derived from the original search term,
wherein the at least one processor is further configured to perform the searching operation based on the original search term and the extended term, display a corresponding relationship between the original search term and the extended term, and the result obtained by performing the searching operation.

3. The search system of claim 2, wherein the at least one processor is configured to
extract extended term from the result by applying pseudo relevance feedback (PRF) based on the original search term.

4. The search system of claim 2,
wherein the extended term is at least any one of a synonym of the original search term, a term indicating upper-level concept of the original search term, a term indicating lower-level concept of the original search term, or a term having co-occurrence relationship with the original search term.

5. The search system of claim 1, wherein the at least one processor is further configured to
correct a query used for performing the searching operation, and
perform a next searching operation based on the corrected query.

6. The search system of claim 1,
wherein the at least one processor is configured to
display the corresponding relationship based on a number of appearing frequency of the search term in the result and a similarity level of the search term and the result.

7. The search system of claim 1, wherein the at least one processor is configured to
display the pattern displaying the search term using a greater character size as a number of appearing frequency of the search term in the result is greater.

8. The search system of claim 7,
wherein when the display pattern is a spiral pattern, and the at least one processor is configured to
display the result at the center of the spiral pattern, and display the search term along the spiral pattern, or
display a second spiral display pattern displaying the search term at the center of the second spiral display pattern, and displaying the result along the spiral pattern.

9. The search system of claim 1, wherein the at least one processor is configured to
display the result and the search term using a second display pattern displaying the search term at the center of the second display pattern and displaying the result at a particular position in the second display pattern, or
display the result at a particular position closer to the center of the second display pattern as the similarity level of the search term and the result obtained by performing the searching operation is higher, and display the result using a greater character size as the number of appearing frequency of the search term in the result is greater.

10. The search system of claim 1, wherein the at least one processor is further configured to:

display a plurality of results obtained by performing the search operation; and
display the display pattern in response to a user selecting a particular result of the plurality of results.

11. The search system of claim 1, wherein the search term is a natural sentence, and the at least one processor is further configured to,
determine a plurality of search terms based on the natural sentence.

12. The search system of claim 1, wherein the display pattern includes a plurality of concentric circles.

13. The search system of claim 1, wherein
the search term includes an original search term, and an extended term derived from the original search term, and
the display pattern includes the original search term and the extended search term displayed in a distinguished manner from one another.

14. The search system of claim 13, wherein the original search term and the extended search term are displayed in different colors.

15. A method comprising:
acquiring a search term;
performing a searching operation based on the search term;
displaying a corresponding relationship between the search term and a result obtained by performing the searching operation; and
display a display pattern including
the result at the center of the display pattern and the search term at a particular position in the display pattern, and
the search term at a position closer to the center as a similarity level of the search term and the result is higher.

16. A non-transitory medium storing one or more instructions that, when performed by at least one processor, cause at least one processor to execute the method of claim 15.

17. The method of claim 15, further comprising:
displaying a plurality of results obtained by performing the search operation; and
displaying the display pattern in response to a user selecting a particular result of the plurality of results.

18. The method of claim 15, wherein the search term is a natural sentence and the method further comprises:
determining a plurality of search terms based on the natural sentence.

19. The method of claim 15, wherein the display pattern includes a plurality of concentric circles.

20. The method of claim 15, wherein
the search term includes an original search term, and an extended term derived from the original search term, and
the display pattern includes the original search term and the extended search term displayed in a distinguished manner from one another.

* * * * *